United States Patent [19]

Takahashi et al.

[11] Patent Number: 5,077,144
[45] Date of Patent: Dec. 31, 1991

[54] PHOSPHOR AND RADIOGRAPHIC INTENSIFYING SCREEN

[75] Inventors: Kenji Takahashi; Terumi Matsuda, both of Kanagawa, Japan

[73] Assignee: Fuji Photo Film Co., Ltd., Kanagawa, Japan

[21] Appl. No.: 77,985

[22] Filed: Jul. 27, 1987

Related U.S. Application Data

[63] Continuation of Ser. No. 913,562, Sep. 29, 1986, which is a continuation of Ser. No. 669,225, Nov. 7, 1984, abandoned, which is a continuation of Ser. No. 452,768, Dec. 23, 1982, abandoned.

[30] Foreign Application Priority Data

Dec. 24, 1981 [JP] Japan .................. 56-212271

[51] Int. Cl.$^5$ .......................................... C09K 11/61
[52] U.S. Cl. .............................. 428/691; 250/483.1; 252/301.4 H; 252/301.4 F; 252/301.6 R
[58] Field of Search ........... 252/301.4 H, 301.4 F, 252/301.6 R; 428/691; 250/483.1

[56] References Cited

U.S. PATENT DOCUMENTS 2,409,174 10/1946 Dietz .......................... 252/301.4 H
4,057,508 11/1977 Wolfe et al. ................. 252/301.4 H
4,076,897 2/1978 Joiner ....................... 252/301.4 H X

FOREIGN PATENT DOCUMENTS 19880 12/1980 European Pat. Off. ...... 252/301.4 H
29963 6/1981 European Pat. Off. ...... 252/301.4 H Primary Examiner—Jack Cooper
Attorney, Agent, or Firm—Sixbey, Friedman, Leedom & Ferguson

[57] ABSTRACT

A divalent europium activated complex halide phosphor having the formula:

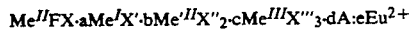

$$Me^{II}FX \cdot aMe^{I}X' \cdot bMe'^{II}X''_2 \cdot cMe^{III}X'''_3 \cdot dA : eEu^{2+}$$

in which $Me^{II}$ is at least one alkaline earth metal selected from the group consisting of Ba, Sr and Ca; $Me^{I}$ is at least one alkali metal selected from the group consisting of Li, Na, K, Rb and Cs; $Me'^{II}$ is at least one divalent metal selected from the group consisting of Be and Mg; $Me^{III}$ is at least one trivalent metal selected from the group consisting of Al, Ga, In and Tl; A is a metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 10^{-2}$, $0 \leq b \leq 10^{-2}$, $0 \leq c \leq 10^{-2}$, and $a+b+c \geq 10^{-6}$; and d and e are numbers satisfying the conditions of $0 \leq d \leq 0.5$ and $0 \leq e \leq 0.2$, respectively. A radiographic intensifying screen containing said phosphor is also disclosed.

10 Claims, No Drawings

PHOSPHOR AND RADIOGRAPHIC INTENSIFYING SCREEN

This application is a continuation of Ser. No. 913,562, filed Sept. 29, 1986, now abandoned, which was a continuation of application Ser. No. 669,225, filed Nov. 7, 1984, now abandoned which was a continuation of application Ser. No. 452,768, filed Dec. 23, 1982, now abandoned.

The present invention relates to a novel phosphor and a radiographic intensifying screen using said phosphor. More particularly, the invention relates to a divalent europium activated complex halide phosphor improved in the emission efficiency and afterglow characteristics, and to a radiographic intensifying screen using said phosphor.

There are previously known phosphors emitting light in near ultraviolet region upon excitation with X-rays, ultraviolet rays or the like. For instance, there is known a divalent europium activated alkaline earth metal fluorohalide phosphor having the formula:

$(Ba_{1-x-y-p}, Sr_x, Ca_y, Eu_p)F(Cl_{1-a-b}, Br_a, I_b)$ in which x, y, p, a and b are numbers satisfying the conditions of $y \leq 0.20$, $x+y+p \leq 1$, $a+b \leq 1$, and $0.01 \leq p \leq 0.20$, as disclosed in Japanese Patent Publication No. 51(1976)-28591. Also known is a phosphor showing an emission efficiency higher than the above-mentioned phosphor, which is a divalent europium activated alkaline earth metal fluorohalide phosphor containing a potassium halide and which has the formula:

$(Me^{II}_{1-x}, Mg_x)F_2 \cdot M'e^{II}X_2 \cdot yKX' : zEu^{2+}$ in which each of $Me^{II}$ and $M'e^{II}$ is at least one element selected from the group consisting of Ba and Sr; each of X and X' is at least one element selected from the group consisting of Cl and Br; and x, y and z are numbers satisfying the conditions of $0 < x \leq 1$, $0 < y \leq 1.5$ and $0.001 \leq z \leq 0.2$, respectively, as disclosed in Japanese Patent Provisional Publication No. 53(1978)-97984.

Further known is a phosphor which is improved in the emission efficiency and afterglow characteristics, as well as kept from sintering in the firing stage involved in the process for the preparation of the rare earth element activated fluorohalide phosphor, and which contains a metal oxide, having the formula:

$Me^{II}FX \cdot xA : yLn$ in which $M^{II}$ is at least one element selected from the group consisting of Ba, Ca, Sr, Mg, Zn and Cd; X is at least one element selected from the group consisting of Cl, Br and I; A is a metal oxide; Ln is at least one element selected from the group consisting of Eu, Tb, Ce, Tm, Dy, Pr, Ho, Nd, Yb, Er, Sm and Gd; and x and y are numbers satisfying the conditions of $5 \times 10^{-5} \leq x \leq 0.5$ and $0 < y \leq 0.2$, respectively, as disclosed in Japanese Patent Provisional Publication No. 55(1980)-160078.

It is generally desired that the emission luminance of a phosphor is as high as possible. Especially when the phosphor is used in a radiographic intensifying screen for X-ray photography for the purpose of medical diagnosis, the phosphor preferably shows high emission luminance so as to reduce the exposure dose of patients. Also desirable is that afterglow of the phosphor is as short as possible so that a virgin X-ray film charged next to the radiation can be kept from exposure by the afterglow of the radiographic intensifying screen.

Accordingly, the present invention contemplates providing an improvement of the previously known divalent europium activated alkaline earth metal fluorohalide phosphor.

A principal object of the invention is to provide a phosphor whose emission luminance, particularly the emission luminance upon excitation with X-rays, is higher and the afterglow is shorter than those of the aforementioned known phosphors.

Another object of the invention is to provide a radiographic intensifying screen which is improved in the radiographic speed and afterglow characteristics, compared with radiographic intensifying screens employing the aforementioned known phosphors.

As a result of earnest studies, the present inventors have found that the specific phosphor defined below shows higher emission luminance and shorter afterglow upon excitation with X-rays, ultraviolet rays or the like, particularly the X-rays, as compared with the aforementioned known divalent europium activated alkaline earth metal fluorohalide phosphor does, so that the below-defined phosphor is of value as a phosphor to be included in a radiographic intensifying screen.

The phosphor provided by the invention is a divalent europium activated complex halide phosphor having the formula:

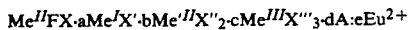

$Me^{II}FX \cdot aMe^{I}X' \cdot bMe'^{II}X''_2 \cdot cMe^{III}X'''_3 \cdot dA : eEu^{2+}$ in which $Me^{II}$ is at least one alkaline earth metal selected from the group consisting of Ba, Sr and Ca; $Me^{I}$ is at least one alkali metal selected from the group consisting of Li, Na, K, Rb and Cs; $Me'^{II}$ is at least one divalent metal selected from the group consisting of Be and Mg; $Me^{III}$ is at least one trivalent metal selected from the group consisting of Al, Ga, In and Tl; A is a metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 10^{-2}$, $0 \leq b \leq 10^{-2}$, $0 \leq c \leq 10^{-2}$, and $a+b+c \geq 10^{-6}$; and d and e are numbers satisfying the conditions of $0 < d \leq 0.5$ and $0 < e \leq 0.2$, respectively.

The divalent europium activated complex halide phosphor of the above-mentioned formula provided by the invention shows the emission spectrum in near ultraviolet region having the emission peak in the vicinity of 390 nm.

In the above-mentioned formula, X can be any halogen selected from the group consisting of Cl, Br and I. Each of X', X'' and X''' can be any halogen selected from the group consisting of F, Cl, Br and I. X', X'' and X''' are the same or different, where a, b and c all are not identical to 0, or where only one of a, b and c is identical to 0. However, in view of the emission luminance, Br and I are preferred, and most preferred is Br.

$Me^{I}$ is preferably selected from the group consisting of Li, Na and K. Na is most preferred. As for $Me'^{II}$, there is no preference between Be and Mg, and both can give almost the same results. $Me^{III}$ is preferably selected from the group consisting of Al and Ga.

The preferred numbers for a indicating the content of $Me^{I}X'$, b indicating the content of $Me'^{II}X''_2$, and c indicating the content of $Me^{III}X'''_3$ are in the ranges of $10^{-5} \leq a \leq 10^{-3}$ (most preferably, $10^{-5} \leq a \leq 5 \times 10^{-4}$), $0 \leq b \leq 10^{-3}$, and $0 \leq c \leq 10^{-3}$, respectively. The total number of a, b and c is required to be not less than $10^{-6}$; and is preferably not less than $10^{-5}$; namely, $a+b+c \geq 10^{-5}$.

In the aforementioned formula, A preferably is at least one metal oxide selected from the group consisting of BeO, MgO, CaO, SrO, ZnO, $Al_2O_3$, $Y_2O_3$, $La_2O_3$, $In_2O_3$, $SiO_2$, $TiO_2$, $GeO_2$, $SnO_2$, $Nb_2O_5$, $Ta_2O_5$ and $ThO_2$. Among these metal oxides, MgO, $Al_2O_3$, $SiO_2$ and $TiO_2$ are preferred from the viewpoint of effective prevention of sintering in the firing stage. Further, $Al_2O_3$ and $SiO_2$ are preferred from the viewpoints of improvements in the emission luminance and afterglow characteristics. Particularly preferred is $SiO_2$, from all the viewpoints. The preferred number for d indicating the content of the metal oxide is in the range of $10^{-5} \leq d \leq 0.3$, from the viewpoints of the prevention of sintering, emission luminance and afterglow characteristics. If d is too large, the emission luminance is tend to lower.

Moreover, e indicating the content of the divalent europium introduced for the activation is preferred in the range of $10^{-4} \leq e \leq 3 \times 10^{-2}$, because the divalent europium in the range imparts high emission luminance to the resulting phosphor.

The phosphor of the invention can be prepared, for example, by the process described below.

As the starting materials for the preparation of the phosphor, the following materials can be employed:
1) at least one fluoride selected from the group consisting of $BaF_2$, $CaF_2$ and $SrF_2$;
2) a halogen donating compound containing at least one halogen selected from the group consisting of Cl, Br and I;
3) at least one halide selected from the group consisting of LiF, LiCl, LiBr, LiI, NaF, NaCl, NaBr, NaI, KF, KCl, KBr, KI, RbF, RbCl, RbBr, RbI, CsF, CsCl, CsBr, CsI, $BeF_2$, $BeCl_2$, $BeBr_2$, $BeI_2$, $MgF_2$, $MgCl_2$, $MgBr_2$, $MgI_2$, $AlF_3$, $AlCl_3$, $AlBr_3$, $AlI_3$, $GaF_3$, $GaCl_3$, $GaBr_3$, $GaI_3$, $InF_3$, $InCl_3$, $InBr_3$, $InI_3$, $TlF_3$, $TlCl_3$, $TlBr_3$ and $TlI_3$.
4) at least one metal oxide or metal compound easily convertible into a metal oxide at an elevated temperature (referred to hereinafter as precursor) such as a nitrate, carbonate, sulfate or hydrate of a metal; and
5) a trivalent europium compound such as a europium halide, europium oxide, europium nitrate or europium sulfate.

The above-mentioned five kinds of the starting materials are, in the first place, mixed in the stoichiometric amounts to obtain a mixture having the formula:

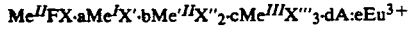

in which $Me^{II}$, $Me^{I}$, $Me'^{II}$, $Me^{III}$, A, X, X', X'', X''', a, b, c, d and e have the same meanings as defined hereinbefore.

The halogen donating compound indicated in the above 2) serves for introducing at least one halogen selected from the group consisting of Cl, Br and I, which is constitutional element of the phosphor. Examples of the halogen donating compounds include halides of divalent metals selected from the group consisting of Ba, Ca and Sr with the exception of their fluorides, that is, chlorides, bromides and iodides; and ammonium halides with the exception of the fluoride, that is, $NH_4Cl$, $NH_4Br$ and $NH_4I$. If the divalent metal halide is employed as the halogen donating compound, donated are not only at least one halogen of Cl, Br and I, but also a part of the divalent metal which is other constituent element of the phosphor of the invention. In other words, the divalent metal of the constitutional element of the phosphor is introduced only by the divalent metal fluoride indicated in the above 1) if the halogen donating compound is not the above-mentioned divalent metal halide, while the divalent metal of the constitutional element of the phosphor is introduced by both the divalent metal fluoride indicated in the above 1) and the halogen donating compound if the above-mentioned divalent metal halide is employed as the halogen donating compound.

The mixture can be prepared by simply mixing the five kinds of the starting materials. Otherwise, the mixture can be prepared by initially producing $Me^{II}FX$ from the compounds indicated in the above 1) and 2) and subsequently mixing the $Me^{II}FX$ with the compounds indicated in the above 3), 4) and 5). In the latter process for the preparation of the mixture for obtaining the phosphor, $Me^{II}FX$ can be prepared from the compounds in the above 1) and 2) in any of various manners known to those skilled in the art. Examples of these known manners are given below.

The compounds of the above 1) and 2) are mixed, and the resulting mixture is heated to a temperature of higher than 100° C. for several hours to give the $Me^{II}FX$; that is a dry process, as disclosed in Japanese Patent Publication No. 51(1976)-28591. Alternatively, the $Me^{II}FX$ can be prepared by adding a solution of the compound of the above 2) to a suspension of the compound of the above 1), and then evaporating the resulting mixture to dryness, preferably under heating (preferably at 50°-250° C.) and reduced pressure; that is a wet process, as disclosed in Japanese Patent Provisional Publication No. 51(1976)-61499. If desired, the compounds of the above 3), 4) and 5) can be introduced into a reaction mixture set for the preparation of the above-mentioned $Me^{II}FX$ so that the compounds of the above 3), 4) and 5) can be mixed homogeneously with $Me^{II}FX$ simultaneously with the production of the $Me^{II}FX$.

The mixture is then placed in a heat-resistant container such as a quartz boat, an alumina crucible or a quartz crucible, and fired in an electric furnace. The temperature for the firing suitably ranges from 600° to 1000° C. The firing period is determined depending upon the amount of the mixture, the firing temperature, etc., and generally ranges from 1 to 6 hours. As the firing atmosphere, there can be employed a weak reducing atmosphere such as a nitrogen gas atmosphere containing a small amount of hydrogen gas or a carbon dioxide gas atmosphere containing a small amount of carbon monoxide gas. In the firing stage, the trivalent europium ($Eu^{3+}$) containing in the mixture is reduced into the divalent europium ($Eu^{2+}$) under the reducing atmosphere.

The product obtained upon firing under the above-mentioned conditions can be again placed in the container and fired in the furnace under the same conditions. Subsequently, the fired product is taken out of the furnace, allowed to stand for cooling, and pulverized. In this second firing, an inert atmosphere such as a nitrogen gas atmosphere or argon gas atmosphere can be employed for the firing in place of the weak reducing atmosphere.

After the firing is complete, the product is processed in a conventional manner involving a variety of procedures, for instance, a procedure for breaking the product into a powder and a procedure for sieving the powdery product, to give the phosphor of the invention.

In the preparation of the phosphor of the invention, the incorporation of the metal oxide effectively keeps the fired product from sintering, so as to facilitate pulverizing the fired product.

The phosphor of the invention obtainable as above emits light with higher luminance upon the excitation with a radiation, especially X-ray radiation, as compared with the known phosphors such as the divalent europium activated alkaline earth metal fluorohalide disclosed in Japanese Patent Publication No. 51(1976)-28591, the divalent europium activated alkaline earth metal fluorohalide containing potassium halide disclosed in Japanese Patent Provisional Publication No. 53(1978)-97984, and the divalent europium activated alkaline earth metal fluorohalide containing a metal oxide disclosed in Japanese Patent Provisional Publication No. 55(1980)-160078. Moreover, the phosphor of the invention is advantageous in that the afterglow appearing after termination of the excitation tends to diminish very rapidly.

The phosphor of the invention is suitably employable in a radiographic intensifying screen.

The radiographic intensifying screen of the invention comprises a support and a phosphor layer containing the divalent europium activated complex halide phosphor placed thereon.

Examples of the supports include papers such as ordinary paper, resin-coated paper and pigment paper; polymer material sheets such as polyethylene, polypropylene and poly(ethylene terephthalate); and metallic sheets such as aluminum foil and aluminum alloy foil.

The phosphor layer comprises a phosphor and a binder consisting essentially of a polymer material. Examples of the polymer materials include polyurethane, poly(methyl methacrylate) and nitrocellulose. There is no specific limitation on the ratio between the amount of the binder and the amount of the phosphor. However, the ratio generally ranges from 1:1 to 1:80 (binder:phosphor) by weight, and preferably ranges from 1:5 to 1:50 by weight.

The phosphor layer placed on the support can be in the form of a single layer or in the form of plural (two or more) layers. If the plural phosphor layers are placed, at least one phosphor layer contains the aforementioned phosphor of the invention. The plural layers can be placed in such a manner that a layer nearer to the surface shows higher emission luminance upon excitation with X-rays, as described in Japanese Patent Provisional Publication No. 50(1975)-126189.

In both the single and plural phosphor layers, a variety of known phosphors capable of emitting light upon excitation with X-rays are employable in combination with the phosphor of the invention.

Examples of the known phosphors include tungstate phosphors such as $CaWO_4$, $MgWO_4$, and $CaWO_4$:Pb; terbium activated rare earth oxysulfide phosphors such as $Y_2O_2S$:Tb, $Gd_2O_2S$:Tb, $La_2O_2S$:Tb, $(Y,Gd)_2O_2S$:Tb, and $(Y,Gd)_2O_2S$ Tb,Tm; terbium activated rare earth phosphate phosphors such as $YPO_4$:Tb, $GdPO_4$:Tb, and $LaPO_4$: Tb; terbium activated rare earth oxyhalide phosphors such as LaOBr:Tb, LaOBr:Tb,Tm, LaOCl:Tb, LaOCl:Tb,Tm, GdOBr:Tb, and GdOCl:Tb; thulium activated rare earth oxyhalide phosphors such as LaOBr:Tm and LaOCl:Tm; barium sulfate phosphors such as $BaSO_4$:Pb, $BaSO_4$:$Eu^{2+}$ and (Ba,Sr)$SO_4$:$Eu^{2+}$; divalent europium activated alkaline earth metal fluorohalide phosphors such as BaFCl: $Eu^{2+}$, BaFBr:$Eu^{2+}$, BaFCl:$Eu^{2+}$,Tb, BaFBr:$Eu^{2+}$,Tb, $BaF_2 \cdot BaCl_2 \cdot KCl$:$Eu^{2+}$, $BaF_2 \cdot BaCl_2 \cdot BaSO_4 \cdot KCl$:$Eu^{2+}$, and (Ba,Mg) $F_2 \cdot BaCl_2 \cdot KCl_2$:$Eu^{2+}$; iodide phosphors such as CsI:Na, CsI:Tl, NaI, and KI:Tl; sulfide phosphors such as ZnS: Ag, (Zn,Cd)S:Ag, (Zn,Cd)S:Cu, and (Zn,Cd)S:Cu,Al; and hafnium phosphate phosphors such as $HfP_2O_7$:Cu.

In the radiographic intensifying screen of the invention, one or more of a variety of layers can be placed between the support and the phosphor layer. Examples of the layers which can be optionally placed include a light reflecting layer for increasing the radiographic speed a light absorbing layer for increasing the sharpness; an undercoating (subbing) layer for enhancing the adhesion between the phosphor layer and the support.

Further, a protective layer made of transparent material can be placed on the phosphor layer to protect chemically and physically the phosphor layer. Furthermore, the phosphor layer and/or the protective layer can be colored with a coloring agent which absorbs a portion of the emission of the phosphor to enhance both the sharpness and resolution of the image, as described in, for instance, Japanese Patent Provisional Publication No. 54(1979)-107692 and U.S. Pat. No. 4,012,637.

As described hereinbefore, the phosphor of the present invention emits light with high luminance upon excitation with a radiation, particularly X-ray radiation. Moreover, the phosphor of the invention shows a shortened afterglow. Accordingly, a radiographic intensifying screen employing the phosphor of the invention provides a high radiographic speed and has excellent afterglow characteristics. For these reasons, the radiographic intensifying screen provided by the invention is of prominent value.

The present invention is now illustrated by the following examples, but these examples by no means restrict the invention.

EXAMPLE 1

Preparation of Referance Phosphor

Phosphor I

In a mortar were well mixed 87.7 g. (0.5 mole) of $BaF_2$, 148.6 g. (0.5 mole) of $BaBr_2$, and 0.392 g. ($10^{-3}$ mole) of $EuBr_3$. The resulting mixture was heated to 160° C. for 5 hours, and subsequently pulverized in an automortar to give a mixture of 1 mole of BaFBr and $10^{-3}$ mole of $EuBr_3$. The so pulverized mixture was placed in a quartz boat and the boat was placed in a tube-type furnace. The mixture was then fired at 800° C. for 2 hours in a stream of nitrogen gas containing hydrogen gas (1% in volume) at the flow rate of 280 cc./min. After the firing was complete, the quartz boat was taken out of the furnace and left at room temperature for cooling.

The fired product was again pulverized in an automortar and placed in the quartz boat. The boat was then placed in the tube-type furnace for carrying out the second firing stage. The second firing stage was carried out at 700° C. for 2 hours in a stream of nitrogen gas at the flow rate of 280 cc./min. After the second firing was complete, the quartz boat was taken out of the furnace and again left at room temperature for cooling. The product fired in the two stages was broken into powder and sieved. There was obtained a phosphor [BaFBr:$10^{-3}$Eu$^{2+}$].

Phosphor II

The procedures for the preparation of Phosphor I [BaFBr:$10^{-3}$Eu$^{2+}$] were repeated except for replacing BaBr$_2$ with 122.2 g. (0.5 mole) of BaCl$_2$·2H$_2$O. There was obtained a phosphor [BaFCl:$10^{-3}$Eu$^{2+}$].

Phosphor III

The procedures for the preparation of Phosphor I [BaFBr:$10^{-3}$Eu$^{2+}$] were repeated except that 87.7 g. of BaF$_2$ and 148.6 g. of BaBr$_2$ were replaced with 83.3 g. of BaF$_2$, 1.6 g. of MgF$_2$, 122.2 g. of BaCl$_2$·2H$_2$O, and 1.78 g. of KBr. There was obtained a phosphor [(Ba$_{0.975}$,Mg$_{0.025}$)FBr·0.015KBr:$10^{-3}$Eu$^{2+}$].

Phosphor IV

The procedures for the preparation of Phosphor I [BaFBr:$10^{-3}$Eu$^{2+}$] were repeated except that 87.7 g. of BaF$_2$ was replaced with 83.3 g. of BaF$_2$, 1.6 g. of MgF$_2$, and 0.37 g. of KCl. There was obtained a phosphor [(Ba$_{0.975}$,Mg$_{0.025}$)FCl·0.005KCl:$10^{-3}$Eu$^{2+}$].

Phosphor V

The procedures for the preparation of Phosphor I [BaFBr:$10^{-3}$Eu$^{2+}$] were repeated except that 0.04 mole of SiO$_2$ was incorporated per 1 mole of BaFBr in the stage for mixing the starting compounds. There was obtained a phosphor [BaFBr·0.04SiO$_2$:$10^{-3}$Eu$^{2+}$].

Phosphor VI

The procedures for the preparation of Phosphor II [BaFCl:$10^{-3}$Eu$^{2+}$] were repeated except that 0.04 mole of SiO$_2$ was incorporated per 1 mole of BaFCl in the stage for mixing the starting compounds. There was obtained a phosphor [BaFCl·0.04SiO$_2$:$10^{-3}$Eu$^{2+}$].

Preparation of Phosphor according to the Invention

Phosphor VII

In a mortar were well mixed 87.7 g. (0.5 mole) of BaF$_2$, 148.6 g. (0.5 mole) of BaBr$_2$, 0.88 g. (0.04 mole) of SiO$_2$, and 0.392 g. ($10^{-3}$ mole) of EuBr$_3$. The resulting mixture was heated to 160° C. for 5 hours, to produce a mixture of 1 mole of BaFBr, 0.04 mole of SiO$_2$, and $10^{-3}$ mole of EuBr$_3$. To the mixture was added 5.2 mg. ($10^{-4}$ mole) of NaBr, and this was well mixed in a ball mill. The resulting mixture was placed in the quartz boat and the boat was placed in the tube-type furnace. The mixture was then fired at 800° C. for 2 hours in a stream of nitrogen gas containing hydrogen gas (1% in volume) at the flow rate of 280 cc./min. After the firing was complete, the quartz boat was taken out of the furnace and left at room temperature for cooling.

The fired product was gently pulverized in a mortar, and then processed in the same manner as described for the preparation of Phosphor I. There was obtained a phosphor [BaFBr·$10^{-4}$NaBr·0.04SiO$_2$:$10^{-3}$Eu$^{2+}$].

Phosphor VIII

The procedures for the preparation of Phosphor VII [BaFBr·$10^{-4}$NaBr·0.04SiO$_2$:$10^{-3}$Eu$^{2+}$] were repeated except for replacing NaBr with 4.8 mg. ($10^{-4}$ mole) of MgCl$_2$. There was obtained a phosphor [BaFBr·$10^{-4}$MgCl$_2$·0.04SiO$_2$:$10^{-3}$Eu$^{2+}$].

Phosphor IX

The procedures for the preparation of Phosphor VII [BaFBr·$10^{-4}$NaBr·0.04SiO$_2$:$10^{-3}$Eu$^{2+}$] were repeated except for replacing NaBr with 6.7 mg. ($10^{-4}$ mole) of AlCl$_3$. There was obtained a phosphor [BaFBr·$10^{-4}$AlCl$_3$·0.04SiO$_2$: $10^{-3}$Eu$^{2+}$].

Phosphor X

The procedures for the preparation of Phosphor VII [BaFBr·$10^{-4}$NaBr·0 04SiO$_2$:$10^{-3}$Eu$^{2+}$] were repeated except for replacing SiO$_2$ with 2 g. (0.04 mole) of Al$_2$O$_3$. There was obtained a phosphor [BaFBr·$10^{-4}$NaBr·0.04Al$_2$O$_3$: $10^{-3}$Eu$^{2+}$].

Phosphor XI

The procedures for the preparation of Phosphor VII [BaFBr·$10^{-4}$NaBr·0.04SiO$_2$:$10^{-3}$Eu$^{2+}$] were repeated except that BaBr$_2$ and NaBr were replaced with 122.2 g. (0.5 mole) of BaCl$_2$·2H$_2$O and 1.3 mg. ($10^{-4}$ mole) of LiF. There was obtained a phosphor [BaFCl·$10^{-4}$LiF·0.04SiO$_2$: $10^{-3}$Eu$^{2+}$].

Preparation of Radiographic Intensifying Screen

Each of the phosphors obtained above [Phosphors I–XI] was dispersed in nitrocellulose, and the dispersion was evenly coated on the surface of a light absorbing layer (containing carbon black) of approximately 250 μm thick provided onto a poly(ethylene terephthalate) support, in such a manner that the phosphor was coated in the amount of 60 mg./cm$^2$ over the support. The so coated phosphor layer was dried, and a protective layer made of poly(methyl methacrylate) of 10 μm thick was placed thereon.

Each of the so prepared radiographic intensifying screens was combined with an X-ray film with the regular sensitivity (Fuji RX, produced by Fuji Photo Film Co., Ltd., Japan), and exposed to X-rays at X-ray tube voltage of 80 KVp to evaluate the photographic sensitivity.

For referance, the conventional radiographic intensifying screen (Hi-Screen STD, produced by Fuji Photo Film Co., Ltd.) containing CaWO$_4$ as phosphor was combined with the same X-ray film and exposed to X-rays under the same conditions.

The results are set forth in Table 1 in terms of the relative values assuming that the photographic sensitivity given by the reference CaWO$_4$ type intensifying screen is 200.

TABLE 1

| | Phosphor | Photographic Sensitivity |
|---|---|---|
| Reference Example | | |
| | CaWO$_4$ | 200 |
| I | BaFBr:$10^{-3}$Eu$^{2+}$ | 400 |
| II | BaFCl:$10^{-3}$Eu$^{2+}$ | 280 |
| III | (Ba$_{0.975}$,Mg$_{0.025}$)FBr·0.015KBr:$10^{-3}$Eu$^{2+}$ | 450 |
| IV | (Ba$_{0.975}$,Mg$_{0.025}$)FCl·0.005KCl:$10^{-3}$Eu$^{2+}$ | 360 |
| V | BaFBr·0.04SiO$_2$:$10^{-3}$Eu$^{2+}$ | 640 |
| VI | BaFCl·0.04SiO$_2$:$10^{-3}$Eu$^{2+}$ | 490 |
| Example | | |
| VII | BaFBr·$10^{-4}$NaBr·0.04SiO$_2$:$10^{-3}$Eu$^{2+}$ | 890 |
| VIII | BaFBr·$10^{-4}$MgCl$_2$·0.04SiO$_2$:$10^{-3}$Eu$^{2+}$ | 850 |
| IX | BaFBr·$10^{-4}$AlCl$_3$·0.04SiO$_2$:$10^{-3}$Eu$^{2+}$ | 840 |
| X | BaFBr·$10^{-4}$NaBr·0.04Al$_2$O$_3$:$10^{-3}$Eu$^{2+}$ | 860 |

TABLE 1-continued

| Phosphor | | Photographic Sensitivity |
|---|---|---|
| XI | BaFCl·10⁻⁴LiF·0.04SiO₄:10⁻³Eu²⁺ | 630 |

In Table 1, Reference Examples I and II are given to represent the phosphors described in Japanese Patent Publication No. 51(1976)-28591; Reference Examples III and IV are given to represent the phosphors described in Japanese Patent Provisional Publication No. 53(1978)-97984; and Reference Examples V and VI are given to represent the phosphors described in Japanese Patent Provisional Publication No. 55(1980)-160078.

As is evident from the results in Table 1, the radiographic intensifying screens containing the phosphors of the invention give prominently high photographic sensitivity in comparison with those containing the various known phosphors. For instance, the comparison on the phosphors comprising BaFCl as the host material is given below. The radiographic intensifying screens containing the known phosphors, namely, BaFCl:10⁻³Eu²⁺ [Phosphor II], $(Ba_{0.975},Mg_{0.025})FCl\cdot 0.005KCl$: 10⁻³Eu²⁺ [Phosphor IV], and BaFCl·0.04SiO₂:10⁻³Eu²⁺ [Phosphor VI] gave the photographic sensitivity at 280, 360, and 490, respectively, while the radiographic intensifying screen containing the phosphor of the invention, namely, BaFCl·10⁻⁴LiF·0.04SiO₂:10⁻³Eu²⁺ [phosphor XI] gave the photographic sensitivity at prominently high 630. This comparison is true of the phosphors comprising BaFBr as the host material.

The above-described comparisons further indicate that the phosphors of the invention emitted light at a luminance higher than that emitted by the known phosphors.

EXAMPLE 2

The radiographic intensifying screen employing Phosphor VII [BaFBr·10⁻⁴NaBr·0.04SiO₂:10⁻³Eu²⁺] prepared in Example 1 was exposed to X-rays at the tube voltage of 80 KVp via a filter corresponding to an aluminum plate of 2 mm thick, so as to receive the X-rays at 3 r. level. After lapse of 1 min. upon completion of the exposure, an X-ray film (Fuji RX, same as above) was combined with the so exposed screen to bring the film into contact with the phosphor layer in a dark place. The combined film and screen was allowed to stand for 24 hours under the same conditions. The film was then separated, developed and fixed to determine the fog density. The fog density thus determined was 0.15. This value was remarkably small, as compared with the fog density of 1.5 determined with respect to the known Phosphor I [BaFBr:10⁻³Eu²⁺] under the same conditions.

The above-described results indicate that the afterglow of the phosphor of the invention is at a low level.

EXAMPLE 3

The procedures for the preparation of Phosphor XI [BaFCl·10⁻⁴LiF·0.04SiO₂:10⁻³Eu²⁺] described in Example 1 were repeated except that the amount of LiF was replaced with 10⁻⁶ mole, 10⁻⁵ mole, 10⁻³ mole, or 10⁻² mole. There were obtained four phosphors mentioned below:

Phosphor XII: BaFCl·10⁻⁶LiF·0.04SiO₂:10⁻³Eu²⁺
Phosphor XIII: BaFCl·10⁻⁵LiF·0.04SiO₂:10⁻³Eu²⁺
Phosphor XIV: BaFCl·10⁻³LiF·0.04SiO₂:10⁻³Eu²⁺
Phosphor XV: BaFCl·10⁻²LiF·0.04SiO₂:10⁻³Eu²⁺.

Each of the phosphors was processed in the same manner as in Example 1 to produce a radiographic intensifying screen. The so produced screen was then evaluated on the photographic sensitivity in the same manner. The results are set forth in Table 2.

TABLE 2

| | Phosphor | Photographic Sensitivity |
|---|---|---|
| XII | BaFCl·10⁻⁶LiF·0.04SiO₂:10⁻³Eu²⁺ | 520 |
| XIII | BaFCl·10⁻⁵LiF·0.04SiO₂:10⁻³Eu²⁺ | 630 |
| XI | BaFCl·10⁻⁴LiF·0.04SiO₂:10⁻³Eu²⁺ | 700 |
| XIV | BaFCl·10⁻³LiF·0.04SiO₂:10⁻³Eu²⁺ | 660 |
| XV | BaFCl·10⁻²LiF·0.04SiO₂:10⁻³Eu²⁺ | 600 |
| | Reference Phosphor | |
| II | BaFCl·10⁻³Eu²⁺ | 280 |
| | CaWO₄ | 200 |

As is evident from the results in Table 2, the radiographic intensifying screens containing the phosphors of the invention give prominently high photographic sensitivity in comparison with those containing the known phosphors. These results also teach that particularly high photographic sensitivity is given where the a indicating the content of LiF is in the range of $10^{-6} - 10^{-2}$. It was further confirmed that the above-mentioned range was also preferred even where the $Me^J X'$ was optionally chosen.

EXAMPLE 4

Phosphor XVI

The procedures for the preparation of Phosphor VII [BaFBr·10⁻⁴NaBr·0.04SiO₂:10⁻³Eu²⁺] were repeated except that 148.6 g. of BaBr and 5.2 mg. of NaBr were replaced with 74.3 g. (0.25 mole) of BaBr₂, 97.8 g. (0.25 mole) of BaI₂, and 16.6 mg. (10⁻⁴ mole) of KI. There was obtained a phosphor [BaFBr₀.₅I₀.₅·10⁻⁴KI·0.04SiO₂:10⁻³ Eu²⁺].

Phosphor XVII

The procedures for the preparation of Phosphor XVI [BaFBr₀.₅I₀.₅·10⁻⁴KI·0.04SiO₂:10⁻³Eu²⁺] were repeated except for replacing 16.6 mg. of KI with 12.7 mg. (10⁻⁴ mole) of GaF₃. There was obtained a phosphor [BaFBr₀.₅I₀.₅·10⁻⁴GaF₃·0.04SiO₂:10⁻³Eu²⁺].

Phosphor XVIII

The procedures for the preparation of Phosphor VII [BaFBr·10⁻⁴NaBr·0.04SiO₂:10⁻³Eu²⁺] were repeated except that 87.7 g. of BaF₂, 148.6 g. of BaBr₂, 5.2 mg. of NaBr, and 0.88 g. of SiO₂ were replaced with 70.1 g. of BaF₂, 12.6 g. of SrF₂, 122.2 g. of BaCl₂·2H₂O, 8.7 mg. (10⁻⁴ mole) of LiBr, and 2 g. (0.04 mole) of Al₂O₃. There was obtained a phosphor [Ba₀.₉,Sr₀.₁)FCl·10⁻⁴LiBr·0.04Al₂O₃:10⁻³Eu²⁺].

Each of these three phosphors was processed in the same manner as in Example 1 to produce a radiographic intensifying screen. The so produced screen was then evaluated on the photographic sensitivity in the same manner. The results are set forth in Table 3.

TABLE 3

| | Phosphor | Photographic Sensitivity |
|---|---|---|
| XVI | $BaFBr_{0.5}I_{0.5} \cdot 10^{-4}KI \cdot 0.04SiO_2:10^{-3}Eu^{2+}$ | 820 |
| XVII | $BaFBr_{0.5}I_{0.5} \cdot 10^{-4}GaF_3 \cdot 0.04SiO_2:10^{-3}Eu^{2+}$ | 790 |
| XVIII | $(Ba_{0.9},Sr_{0.1})FCl \cdot 10^{-4}LiBr \cdot 0.04Al_2O_3:10^{-3}Eu^{2+}$ | 680 |
| | Reference Phosphor | |
| I | $BaFCl:10^{-3}Eu^{2+}$ | 280 |
| II | $BaFBr:10^{-3}Eu^{2+}$ | 400 |
| | $CaWO_4$ | 200 |

As is evident from the results in Table 3, the radiographic intensifying screens containing the phosphors of the invention give prominently high photographic sensitivity. In addition, the results given in Table 3 were determined on the radiographic intensifying screens containing the phosphor activated with $Eu^{2+}$ at the $10^{-3}$ mole level. However, it was confirmed that the high photographic sensitivity was also given even where the amount of $Eu^{2+}$ for the activation was varied within the range defined in the invention.

We claim:

1. A divalent europium activated complex phosphor having the formula:

$$Me^{II}FX \cdot aNaX' \cdot dA:eEu^{2+}$$

in which $Me^{II}$ is at least one alkaline earth metal selected from the group consisting of Ba, Sr, and Ca; A is at least one metal oxide selected from the group consisting of BeO, MgO, CaO, SrO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; X is at least one halogen selected from the group consisting of Cl, Br and I; X' is at least one halogen selected from the group consisting of F, Cl, Br, and I; a is a number satisfying the condition of $10^{-6} \leq a \leq 10^{-2}$; and d and e are numbers satisfying the conditions of $0 < d \leq 0.5$ and $0 < e \leq 0.2$, respectively, said phosphor showing higher emission luminance and shorter afterglow upon excitation with X-rays as compared with the corresponding phosphor having the formula:

$$Me^{II}FX:eEu^{2+}$$

wherein $Me^{II}$, X and e have the same meanings as above.

2. The phosphor as claimed in claim 1, in which $Me^{II}$ is Ba.

3. The phosphor as claimed in claim 1, in which A is at least one metal oxide selected from the group consisting of MgO, $Al_2O_3$, $SiO_2$ and $TiO_2$.

4. The phosphor as claimed in claim 1, in which d is a number satisfying the condition of $10^{-5} \leq d \leq 0.3$.

5. The phosphor as claimed in claim 1, in which e is a number satisfying the condition of $10^{-4} \leq e \leq 3 \times 10^{-2}$.

6. A radiographic intensifying screen comprising a support and at least one phosphor layer placed thereon, in which at least one phosphor layer comprises a divalent europium activated complex halide phosphor having the formula:

$$Me^{II}FX \cdot aNaX' \cdot dA:eEu^{2+}$$

in which $Me^{II}$ is at least one alkaline earth metal selected from the group consisting of Ba, Sr, and Ca; A is at least one metal oxide selected from the group consisting of BeO, MgO, CaO, SrO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; X is at least one halogen selected from the group consisting of Cl, Br and I; X' is at least one halogen selected from the group consisting of F, Cl, Br, and I; a is a number satisfying the condition of $10^{-6} \leq a \leq 10^{-2}$; and d and e are numbers satisfying the conditions of $0 < d \leq 0.5$ and $0 < e \leq 0.2$, respectively, said phosphor showing higher emission luminance and shorter afterglow upon excitation with X-rays as compared with the corresponding phosphor having the formula:

$$Me^{II}FX:eEu^{2+}$$

wherein $Me^{II}$, X and e have the same meanings as above.

7. The radiographic intensifying screen as claimed in claim 6, in which $Me^{II}$ is Ba.

8. The radiographic intensifying screen as claimed in claim 6, in which A is at least one metal oxide selected from the group consisting of MgO, $Al_2O_3$, $SiO_2$ and $TiO_2$.

9. The radiographic intensifying screen as claimed in claim 6, in which d is a number satisfying the condition of $10^{-5} \leq d \leq 0.3$.

10. The radiographic intensifying screen as claimed in claim 6, in which e is a number satisfying the condition of $10^{-4} \leq e \leq 3 \times 10^{-2}$.

* * * * *